July 3, 1962
D. F. GOODWINE
3,041,673
METHOD OF CURING THERMOSETTING JACKETS ON
MULTICONDUCTOR CABLES
Filed March 14, 1960
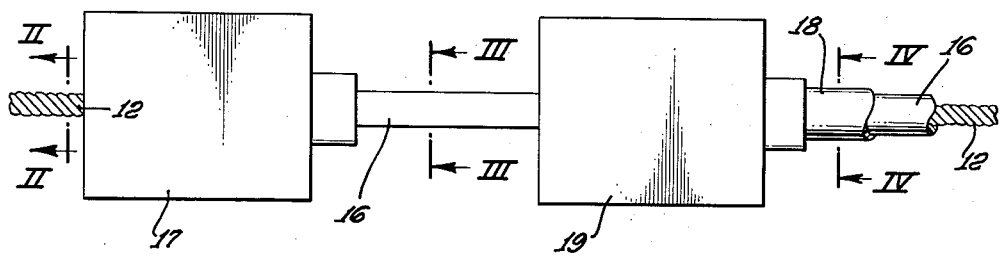
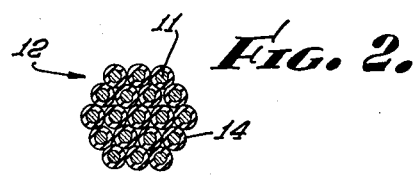
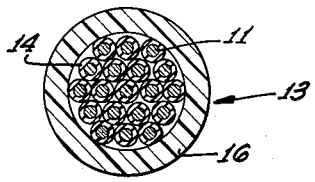
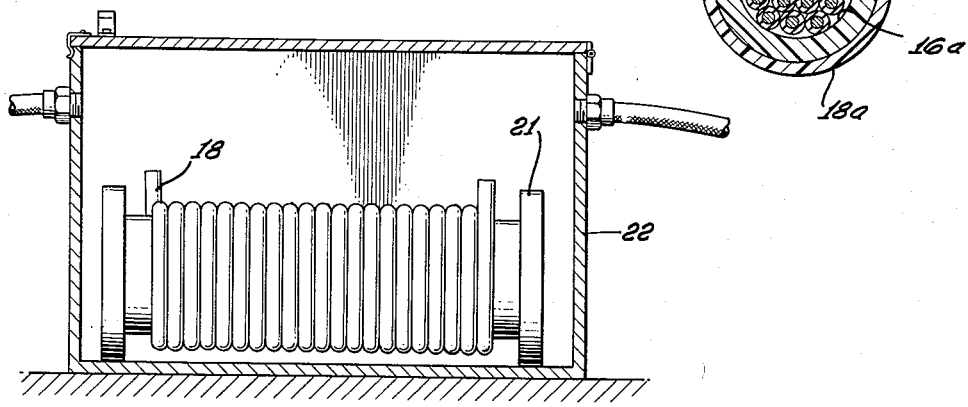
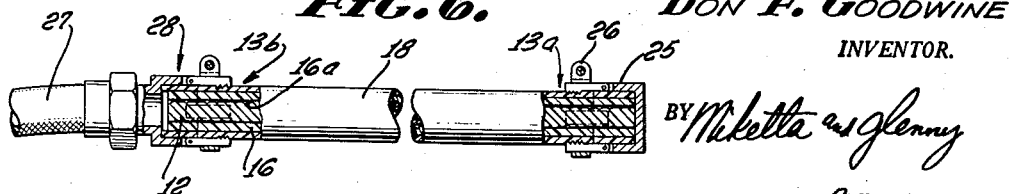
DON F. GOODWINE
INVENTOR.
BY *Miketta and Glenny*
ATTORNEYS.

United States Patent Office 3,041,673
Patented July 3, 1962

3,041,673
METHOD OF CURING THERMOSETTING JACKETS ON MULTICONDUCTOR CABLES
Don F. Goodwine, Alhambra, Calif., assignor to Pacific Automation Products, Inc., Glendale, Calif., a corporation of California
Filed Mar. 14, 1960, Ser. No. 14,984
4 Claims. (Cl. 18—53)

This invention relates to a method of curing thermosetting protective jackets on multiconductor cables or the like in an inexpensive manner so as to provide a cured protective jacket with a smooth, unlumpy outer surface and which is dense, substantially free of air bubbles, is of uniform thickness, and is flexible in relatively low temperatures as well as in warm climates.

Multiconductor electrical cables in both military and industrial applications are generally required to be flexible and durable and are therefore provided with thermosetting outer protective jackets generally made of a synthetic rubber such as neoprene. After a thermosetting protective jacket has been provided on a cable, generally by extrusion, the jacket must be cured whereby it is dense, free of air bubbles and sufficiently hard to resist wear but still be flexible enough to enable the cable to be wound on a reel, even in extremely cold climates below temperatures of −65° F.

Most thermosetting materials will cure at temperatures inversely proportionate to time. The higher the temperature, the shorter the time required for curing. But it is recognized that thermosetting materials generally are denser and of better quality when cured at relatively low temperatures for a longer time.

If a multiconductor cable having an uncured thermosetting outer protective jacket were subjected to heat and pressure, the cured thermosetting jacket would sag, be of non-uniform thickness and be too porous. Heretofore, in an attempt to satisfactorily cure the thermosetting cable jackets, lead covers were provided around the uncured thermosetting cable jackets. The lead covered cables were then subjected to heat and pressure in a curing device, such as an autoclave, until the jackets were cured. The lead coverings were then removed.

It has been found that the lead covering curing system has many disadvantages. The apparatus required for providing lead around a cable is very expensive, costing approximately one-quarter of a million dollars. Also, since lead has a high specific heat, very high temperatures are required to adequately heat the lead and cure the thermosetting jacket in a relatively short time. Dependent upon the thickness of the lead, temperatures well above 300° F. are generally required for curing. Such temperatures require an expensive autoclave or other curing device. Moreover, relatively high temperatures above 200° F. are objectionable, as the insulation on the inner electrical conductors is gnerally made of thermoplastics deforming at approximately 200° F.

A major disadvantage of the lead covering curing system is that the uncured thermosetting compound used to form the outer protective jacket is required to be stiff and rigid and when cured is not suitable for use in extremely cold climates, especially below −65° F. In cold climates, the outer cured jacket of the cable is still required to be flexible, which means that relatively few fillers, such as clay and carbon black, may be added to the uncured thermosetting compound. This therefore requires the uncured compound to be mushy or extremely pliable, rather than substantially stiff.

Lead is a substantially rigid material. When it is applied over a mushy uncured thermosetting layer so as to leave no air space therebetween, the lead squeezes or forces the mushy thermosetting layer rearwardly causing the lead-applying apparatus to eventually jam and providing non-uniform thicknesses for the thermosetting layer. If the lead-retaining cover is applied with an inner diameter substantially greater than the outer diameter of the thermosetting layer, then air bubbles will be entrapped therebetween during the curing step. This would produce a cured thermosetting jacket with a lumpy outer surface which is not satisfactory for military or industrial uses.

It can therefore be understood that when using the lead curing system, the uncured thermosetting compound for the outer jacket of the cable is required to have a predetermined stiffness or rigidity to resist being milked or forced rearwardly when the lead is applied. The predetermined stiffness in the compound is obtained through the addition of fillers which prevents the cured jacket from being flexible in extremely cold climates.

Accordingly, it is a general object of the present invention to provide a method of curing thermosetting jackets on multiconductor cables or the like that avoids all of the foregoing disadvantages of similar type methods used heretofore.

An object of the present invention is to provide a method of curing thermosetting jackets on a multiconductor cable or the like so as to provide a cured jacket with a smooth, unlumpy outer surface.

Another object is to provide an extremely simple and inexpensive method of curing thermosetting jackets on multiconductor cables or the like.

A further object is to provide a method of curing thermosetting jackets on multiconductor cables or the like utilizing relatively low curing temperatures and avoiding deforming or melting the insulation covering the inner electrical conductors in the cable.

Another object is to provide a method of curing thermosetting cable jackets which are flexible and pliable in extremely cold weather as well as warm climates.

Still another object is to provide a method of curing thermosetting cable jackets whereby entrapped air bubbles may immediately be detected and eliminated, thus preventing the cured jackets from having lumpy outer surfaces.

Other objects and advantages of this invention will be readily apparent from the following description when considered in connection with the appended drawings.

In the drawings:
FIG. 1 is a diagrammatic side elevation of a cable passing through exemplary apparatus that may be used in performing the method of the present invention;
FIG. 2 is a transverse section of a cable taken along plane II—II of FIG. 1;
FIG. 3 is a transverse section of a cable after a thermosetting jacket was applied, taken along plane III—III of FIG. 1;
FIG. 4 is a transverse section of a cable after a thermosetting jacket and thermoplastic retaining cover were applied, taken along plane IV—IV of FIG. 1;
FIG. 5 is a longitudinal section through a typical autoclave having a reel of cable therein to be cured; and
FIG. 6 is a side elevation, partly in section of the retaining cover being used as an independent curing chamber.

In accordance with the method of the present invention, thermosetting cable jackets may be cured simply, inexpensively, with a smooth outer surface, and still be flexible in cold weather. The apparatus shown in the drawings are only exemplary of what may be used in performing the present invention. Therefore, for clarity, the apparatus are diagrammatically shown as the details thereof form no part of the present invention.

As is generally the procedure, a plurality of electrical conductors 11 are preferably helically wound together to form an inner core 12 of a multiconductor cable 13. Each conductor 11 is preferably provided with a layer or covering of insulation 14. It is extremely important that the insulation 14 on the conductors 11 not be deformed or melted to prevent shorting of the conductors 11.

Various materials may be used for insulating the electrical conductors 11. At present, thermoplastic materials have been found to be very satisfactory for insulation uses when considering quality, inexpensiveness, and ease of applying. One particular thermoplastic, polyethylene, has been used quite extensively and has a deformation temperature of about 203° F. and a melting temperature of 239° F. It is understood that other thermoplastics may also be used.

The inner core 12 of conductors is then covered with a continuous outer layer of thermosetting material to form an outer uncured protective jacket 16. This is preferably accomplished by passing the inner core 12 of insulated electrical conductors through an extruder 17 of well known design to those skilled in the art. The extruder 17 is adapted to cover the inner core 12 with a jacket of uncured thermosetting material 16 of a uniform circumferential thickness, generally about .187 inch. While various thermosetting materials such as silicone rubbers may be used for the jacket 16, it has been found that neoprene is very satisfactory for such a purpose. While neoprene may be extruded at varying temperatures, a maximum of 225° F. should be used. As with most thermosetting materials, neoprene cures at temperatures inversely proportional to time. However, it is desirable to cure neoprene and other thermosetting materials at low temperatures for a longer period of time in order to produce a denser and better quality cured article. Therefore, it has been found that a neoprene jacket may be cured at temperatures between 170° F. and 190° F. under a pressure of approximately 60 p.s.i. Also, at a curing temperature of about 180° F. for the neoprene, the thermoplastic insulation 14 on the electrical conductors will not deform nor melt.

It is understood that the rigidity and stiffness of the thermosetting jacket is controllable by the amount of fillers that are added. In cold weather less fillers are used to allow the jacket to remain flexible. This produces a mushy or soft uncured thermosetting compound when applied by the extruder 17.

While the thermosetting jacket 16 is still uncured, a continuous, thermoplastic, substantially fluid-tight curing and retaining cover 18 is provided around the uncured jacket 16, preferably by extrusion. An extruder 19 of a type similar to the thermosetting extruder 17 and also of well known design to those skilled in the art, may be located adjacent to the extruder 17 and may receive the cable having an uncured thermosetting jacket 16 immediately after leaving the thermosetting extruder 17. The uncured thermosetting jacket 16 will have cooled and hardened sufficiently between the extruders 17 and 19 to permit the thermoplastic cover 18 to be provided thereon. However, it is understood that means may be provided for cooling the uncured jacket 16 between the extruders 17 and 19 if necessary.

It is understood that various thermoplastics may be used for the curing and retaining cover 18 in the present invention. However, a substantially transparent polyethylene is a suitable material having a deformation temperature of 203° F., a melting temperature of 239° F. and has sufficient tensile strength to function as a retainer during the curing of the thermosetting jacket 16. A suitable polyethylene material may have a density of 0.923 gm./cc. and melt index of 1.8. Moreover, polyethylene and other thermoplastics such as nylon and polypropylene are sufficiently flexible and pliable to conform to the outer surface of the uncured thermosetting jacket without milking or squeezing the thermosetting material rearwardly, even if the thermosetting material is extremely mushy or soft due to having relatively few fillers. By using a thermoplastic retaining cover, a thermosetting cable jacket may thus be cured and used in cold as well as warm weather.

Moreover, it is preferred that transparent thermoplastics be used for the retaining cover to allow air bubbles to be detected if entrapped between the retaining cover and the uncured thermosetting jacket. The operator of the extruder after observing any entrapped air bubbles through the transparent retaining cover, may make various adjustments to the extruder, such as changing the gum space, so as to eliminate the air bubbles. This allows only a short length of cable jacket to be rejected for having a lumpy outer surface due to entrapped air bubbles, rather than continuing to allow air bubbles to become entrapped so as to produce an entire length cable jacket which would be discarded. This is not possible in the lead curing system.

After the cable 13 is covered with the curing and retaining cover 18, the thermosetting jacket 16 is subjected to heat and pressure to cure it. The present invention preferably contemplates two different steps of curing the thermosetting jacket.

One method of curing the uncured jacket 16 is to wind a length of the cable 13 containing a thermoplastic retaining cover 18 on a reel 21 and insert it into an autoclave 22 or any other well known curing device which may be provided with pressurized and heated fluid. The ends of the uncured cable are open as shown in FIG. 5 so that the fluid passes down through the interstices of the conductors of the inner core 12, as well as around the outside of the retaining cover 18. Therefore, the inner surface 16a of the thermosetting jacket 16 and the outer surface 18a of the thermoplastic retaining cover 18 are subjected to pressurized and heated fluid for a sufficient time to cure the jacket 16 and for forcing the jacket into tight, frictional contact with the retaining cover 18. The temperature of the heated fluid is lower than the deformation temperature of the insulation 14 for the electrical conductors 11 and sufficiently high to cure the thermosetting jacket during a predetermined time.

When neoprene is used for the thermosetting jacket, and polyethylene for the thermoplastic retaining cover and the insulation for the electrical conductors, the curing fluid in the autoclave 22 may be at a temperature of approximately 180° F. and at a pressure of 60 p.s.i.

The heated and pressurized fluid forces the thermosetting jacket 16 into tight forming contact with thermoplastic retaining cover 18 which has a tensile strength sufficient to uniformly retain the jacket in a cylindrical shape. This produces a smooth, non-lumpy protective outer jacket for the cured cable.

After the jacket 16 is cured, the cable is removed from the autoclave 22 and the thermoplastic cover 18 may be removed by any well known stripper means which may include a plurality of rotatable cutting elements arranged circumferentially about a central opening of a diameter the same as the outer diameter of the jacket 16. It is contemplated that the retaining cover may be left on after the jacket is cured for insulation purposes.

Before the retaining cover 18 is removed, the cured thermosetting jacket 16 may be cooled by dipping it into a water bath or the like.

The other method of curing the jacket 16 in accordance with the present invention is to utilize the curing and retaining cover 18 as an independent curing chamber without the need of an expensive autoclave or other device in which the cable is inserted for curing. After the thermoplastic, fluid-tight curing and retaining cover 18 has been provided around the uncured thermosetting jacket 16 as described above, one end 13a (FIG. 6) of the cable 13 is provided with a fluid-tight seal 25. This seal 25 may be a flexible cap of cured synthetic rubber secured in a fluid-tight manner to the cable end 13a by means of a clamp 26. Other type seals may also be used in capping the cable.

Pressurized and heated fluid is forced into the other end 13b of the cable 13 for curing the thermosetting jacket 16. It is preferred that a fluid hose 27 be clamped by suitable and well known coupling means 28 to the other cable end 13b in a fluid-tight manner and that heated and pressurized fluid be transmitted through the hose 27 from a fluid source (not shown) to the inner surface 16a of the uncured thermosetting jacket 16. The curing fluid will pass down through the interstices of the electrical conductors of the inner core 12 and force the uncured thermosetting jacket into tight, frictional contact with the retaining cover 18. Sufficient heat is provided around the retaining cover 18 during the curing operation. However, it is preferred that atmospheric pressure be maintained on the outside of cover 18, thus creating a differential pressure on the thermosetting jacket 16.

The thermoplastic retaining cover is fluid-tight and has sufficient tensile strength to function as an independent curing chamber as well as a retaining cover for the thermosetting jacket while curing.

After the thermosetting jacket 16 is cured, the seal 25 and fluid hose 27 are detached and the retaining cover 18 is removed from around the cured jacket 16. The cured and finished cable is thus provided with a flexible but durable thermosetting jacket which is smooth and non-lumpy. Low curing temperatures are utilized preventing the insulation around the electrical conductors from becoming deformed, which could short the conductors.

It can therefore be seen that the present invention provides an efficient method of curing thermosetting jackets for multiconductor cables without the tremendous expense involved in methods used heretofore. The present invention completely eliminates the need of the expensive lead curing system and provides a better quality cable jacket. By using the retaining cover as an independent curing chamber, the cost is further reduced by eliminating the necessity of an autoclave.

Moreover, cured thermosetting cable jackets may be produced which are flexible in cold and warm climates. This is not possible with lead curing systems. This is an extremely important advantage of the present method as heretofore it has been difficult to cure thermosetting cable jackets which are still flexible when used in temperatures below −65° F. Also, the present method insures the constant production of a cable jacket with a smooth outer jacket unmarred by air bubbles during the curing operation.

It is preferred that the curing fluid used in the present invention be heated, pressurized air. However, the uncured cable and retaining jacket may be submerged in heated water with the ends thereof above the water. Then heated and pressurized fluid may be forced through the uncured thermosetting jacket until it is cured.

Obviously many modifications and variations of the present invention are possible in the light of the above teachings. It is therefore to be understood that within the scope of the appended claims the invention may be practiced otherwise than as specifically described.

I claim:

1. A method of curing a thermosetting protective jacket on a multiconductor cable so as to provide a cured jacket with a smooth, non-lumpy outer surface which retains its flexibility at temperatures of approximately −65° F., comprising the steps of: providing an elongated inner core of a plurality of electrical conductors, each of which is covered by insulation; covering said inner core of conductors with an uncured, continuous thermosetting protective jacket having a substantially smooth, cylindrical, inner surface so as to provide spaces between the outer surface of said inner core and the substantially smooth, cylindrical inner surface of said jacket; covering said uncured, thermosetting protective jacket with a continuous, flexible, thermoplastic, substantially fluid-tight curing and retaining cover so as to have the retaining cover conform to the surface of the jacket; subjecting both the inner surface of the thermosetting jacket and the outer surface of the thermoplastic retaining cover to pressurized and heated fluid for a sufficient time to cure the jacket and for forcing the jacket into tight frictional contact with said retaining cover while said jacket and cable are stationary to provide substantially cylindrical inner and outer surfaces to said jacket when cured, the temperature of the heated fluid being lower than the deformation temperature of the insulation for the electrical conductors and sufficiently high to cure the thermosetting jacket for a predetermined time, and removing the curing and retaining cover after the jacket is cured.

2. A method of curing a thermosetting protective jacket on a multiconductor cable so as to provide a cured jacket with a smooth, non-lumpy outer surface which retains its flexibility at temperatures of approximately −65° F., comprising the steps of: providing an elongated inner core of a plurality of electrical conductors, each of which is covered by insulation; covering said inner core of conductors with an uncured, continuous thermosetting protective jacket having a substantially smooth, cylindrical inner surface so as to provide spaces between the outer surface of said inner core and the substantially smooth, cylindrical inner surface of said jacket; covering said uncured, thermosetting protective jacket with a continuous, flexible, thermoplastic, substantially fluid-tight curing and retaining cover so as to have the retaining cover conform to the surface of the jacket; and subjecting both the inner surface of the thermosetting jacket and the outer surface of the thermoplastic retaining cover to pressurized and heated fluid for a sufficient time to cure the jacket and for forcing the jacket into tight frictional contact with said retaining cover while said jacket and cable are stationary to provide substantially cylindrical inner and outer surfaces to said jacket when cured, the temperature of the heated fluid being lower than the deformation temperature of the insulation for the electrical conductors and sufficiently high to cure the thermosetting jacket for a predetermined time.

3. A method as stated in claim 2, wherein the thermosetting jacket is neoprene, the thermoplastic retaining cover is polyethylene, the curing temperature of the fluid is between 170° F. and 190° F., and the curing pressure of the fluid is about 60 p.s.i., and including the step of removing the retaining cover after the jacket is cured.

4. A method of curing a thermosetting protective jacket on a multiconductor cable so as to provide a cured jacket with a smooth, non-lumpy outer surface which retains its flexibility at temperatures of approximately −65° F., comprising the steps of: providing a continuous uncured thermosetting material of uniform thickness around an inner core of electrical conductors covered by thermoplastic insulation, said thermosetting material having a substantially smooth, cylindrical inner surface so as to provide spaces between the outer surface of said inner core and the substantially smooth, cylindrical inner surface of said thermosetting material covering the uncured, thermosetting protective jacket of the cable with a continuous thermoplastic, substantially fluid-tight curing and retaining cover so as to have the retaining cover conform to the surface of the jacket, sealing in a fluid-tight manner one end of the multiconductor cable having the retaining cover so as to allow the retaining cover to function as an independent curing chamber for the thermosetting jacket, subjecting heated fluid to the outer surface of the thermoplastic cover and subjecting the inner surface of the thermosetting jacket to pressurized and heated fluid through the other end of the cable when the cable is stationary for a sufficient time to cure the jacket and for forcing the jacket into tight, frictional contact with the retaining cover which functions as a separate curing chamber without dependency on an outside curing chamber, the temperature of the heated fluid being lower than the deformation temperature of the insulation for the electrical conductors and sufficiently high to cure the thermosetting jacket during a predetermined time, and removing the curing and retaining cover.

References Cited in the file of this patent

UNITED STATES PATENTS

| | | |
|---|---|---|
| 1,269,229 | Smith | June 11, 1918 |
| 1,730,639 | Blaker | Oct. 8, 1929 |
| 2,364,167 | Scott | Dec. 5, 1944 |
| 2,525,662 | Freeman | Oct. 10, 1950 |
| 2,553,938 | Peirce | May 22, 1951 |
| 2,586,763 | Judisch | Feb. 19, 1952 |
| 2,739,351 | Henning | Mar. 27, 1956 |